United States Patent [19]
Grognard

[11] Patent Number: 4,555,078
[45] Date of Patent: Nov. 26, 1985

[54] APPARATUS FOR THE SUSPENSION OF AN AIRCRAFT ENGINE COWLING

[75] Inventor: Léon L. Grognard, Wezembeek-Oppem., Belgium

[73] Assignee: Société Belge d'Exploitation de la Navigation Aérienne (SABENA), Brussels, Belgium

[21] Appl. No.: 565,581

[22] Filed: Dec. 27, 1983

[51] Int. Cl.$^4$ ............................................. B64D 27/00
[52] U.S. Cl. ..................................... 244/54; 248/554; 60/39.31; 60/226.1
[58] Field of Search ............. 244/54, 53 R; 60/226.1, 60/39.31, 262; 248/554–557, 645

[56] References Cited

U.S. PATENT DOCUMENTS

| | | | |
|---|---|---|---|
| 3,750,983 | 8/1973 | Morris | 244/54 |
| 4,013,246 | 3/1977 | Nightingale | 244/54 |
| 4,437,627 | 3/1984 | Moorehead | 244/54 |

FOREIGN PATENT DOCUMENTS 2550525  5/1976  Fed. Rep. of Germany ........ 244/54

OTHER PUBLICATIONS

Murphy et al., WO 83/003396, PCT, 13 Oct. 1983.

*Primary Examiner*—Galen L. Barefoot
*Attorney, Agent, or Firm*—Spencer & Frank

[57] ABSTRACT

An upper pylon element suspended to a flexmount member to be attached to a supporting structure, includes a suspension device having a first hook device arranged to cooperate with an attachment device on a lower pylon element, and a second hook device for suspension of the fan duct, the suspension device having a first operating state in which the first hook device is coupled with the attachment device on the lower pylon element thereby to suspend the lower pylon element to the upper pylon element and a second operating state in which the first and second hook devices are disengaged from the corresponding attachment device; a locking unit arranged when it is operated, to lock the lower pylon element to the core cowl; and a drive unit to actuate the suspension device and the locking unit from one operating state to the other.

10 Claims, 6 Drawing Figures

APPARATUS FOR THE SUSPENSION OF AN AIRCRAFT ENGINE COWLING

BACKGROUND OF THE INVENTION

The present invention relates to an apparatus for the suspension of an aircraft turbo-fan engine cowling to a supporting structure, especially for a high by-pass ratio engine of high thrust rating.

Particularly these large engines exhibit significant deflections and distortions due to a combination of engine mount reactive forces and external moments applied by aerodynamic loads on the engine inlet ducting. The primary deflection experienced during operation of the engine is caused by the bending moment under high power. The high thrust load is a summation of internal forces, the resultant of which acts along the centerline of the engine. The engine mounts react this force back to the supporting structure. Due to other installation requirements, this reaction force is above the centerline of the engine, resulting in the afore-mentioned bending moment.

Basic aircraft design dictates the use of thin walled engine cases, resulting in significant deflections which adversely affect the performance of the engine. The efficiency of an engine requires close clearances between the rotors and the engine cases. Deflections of the cases result in contact between the rotors and the engine cases and a loss of efficiency due to the resulting blade rubbing.

The cowling required for securing the engine basically forms a tubular member around the engine that can be utilized to reduce engine case deflections. The utilization of cowling in this manner is called Cowl Load-Sharing (CLS). Installation, removal and servicing of the engine requires the cowling to be in two halves. When opened these are suspended from hinges attached to a suspension apparatus. When closed during engine operation, these halves are suitably tied together, forming the tubular member that is being utilized to reinforce the engine and reduce engine case deflections.

The currently used apparatus for the suspension of an aircraft jet engine includes a flexmount unit secured to the supporting structure and a pylon attached underneath the flexmount unit and to which the engine cowling is suspended. In this prior art suspension apparatus, the cowling is suspended by attachment means on its front and rear parts. The flexmount unit is caused to bend under the weight and thrust of the engine during operation and as a result from the method of suspension of the cowling cowl load sharing cannot be achieved and detrimental engine case deflections cannot be avoided during engine operation, resulting in the afore-mentioned blade rubbing and the consequent loss of efficiency. There was thus a problem to be solved in order obviate the above drawbacks.

SUMMARY OF THE INVENTION

The object of the invention is to provide a suspension apparatus for an aircraft turbo-fan engine which permits a high thrust-rating engine to operate in Cowl Load Sharing mode and which permits safe and rigid attachment of the engine for repair and servicing purposes.

In accordance with this invention, the suspension apparatus comprises a flexmount member to be attached to the supporting structure and a pylon, said pylon including an upper pylon element suspended to the flexmount member and a lower pylon element, the lower pylon element having attachment means for suspension; a suspension device arranged in the upper pylon element and having first hook means arranged to cooperate with said attachment means on the lower pylon element, and second hook means for suspension of the fan duct, said suspension device having a first operating state in which said first hook means are coupled with said attachment means on the lower pylon element thereby to suspend the lower pylon element to the upper pylon element and a second operating state in which said first and second hook means are disengaged from the corresponding attachment means; locking means arranged when it is operated, to lock the lower pylon element to the core cowl; and drive means to actuate the suspension device and the locking means from one operating position to the other.

Using the suspension apparatus of this invention is suspend a high thrust-rating turbo-fan engine to an aircraft structure, e.g. aircraft wings, makes it possible to operate the engine with optimum efficiency while permitting safe and rigid attachment of the engine for repair and servicing. On the other hand, when used in a test thrust stand for ground testing of an aircraft engine, the suspension apparatus of the invention permits testing of the engine in Cowl Load-Sharing mode.

DESCRIPTION OF AN EXEMPLARY EMBODIMENT OF THE INVENTION

Figure 1:
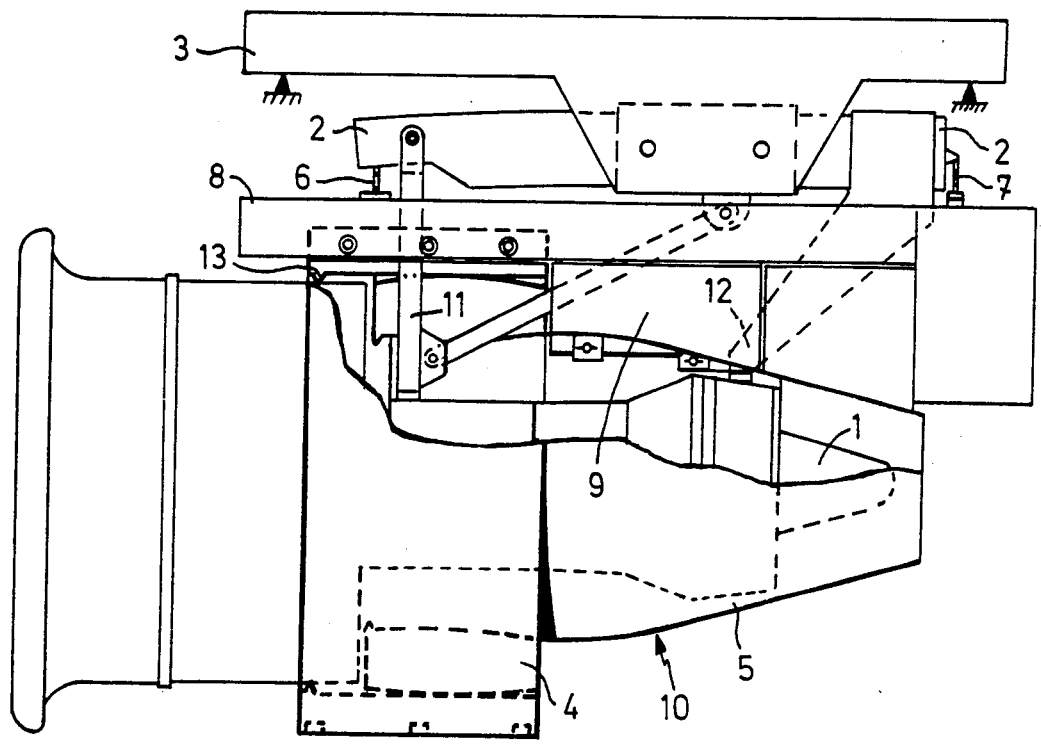
FIG. 1 depicts a turbo-fan engine with its cowling together with its suspension apparatus.

Referring to FIG. 1 there is shown a general view of a turbo-fan engine and its cowling arranged for being utilized in load sharing mode (CLS) together with its suspension apparatus. The engine 1 is attached to a flexmount member 2 by front attachment means 11 and rear attachment means 12. The flexmount member 2 is attached to a supporting structure by means of a specific adapter of which an exemplary embodiment is shown at 3. The cowling 10 has a fan duct part 4 and a core cowl part 5 which form a tubular member around the engine, said tubular member serving to reinforce the engine and reduce engine case deflections. The cowling is connected to the engine 1 by means of "V" blade and groove connections 13 at the front of the fan duct 4 and lateral latches at the rear of the core cowl 5. Suspended from the flexmount member 2 by attachment means 6 and 7 is an upper pylon 8 which houses the engine mounts, suspension means for the fan duct 4 and a lower pylon 9 as will be described in detail later herein and ancillary equipment required to operate the engine.

Figure 2:
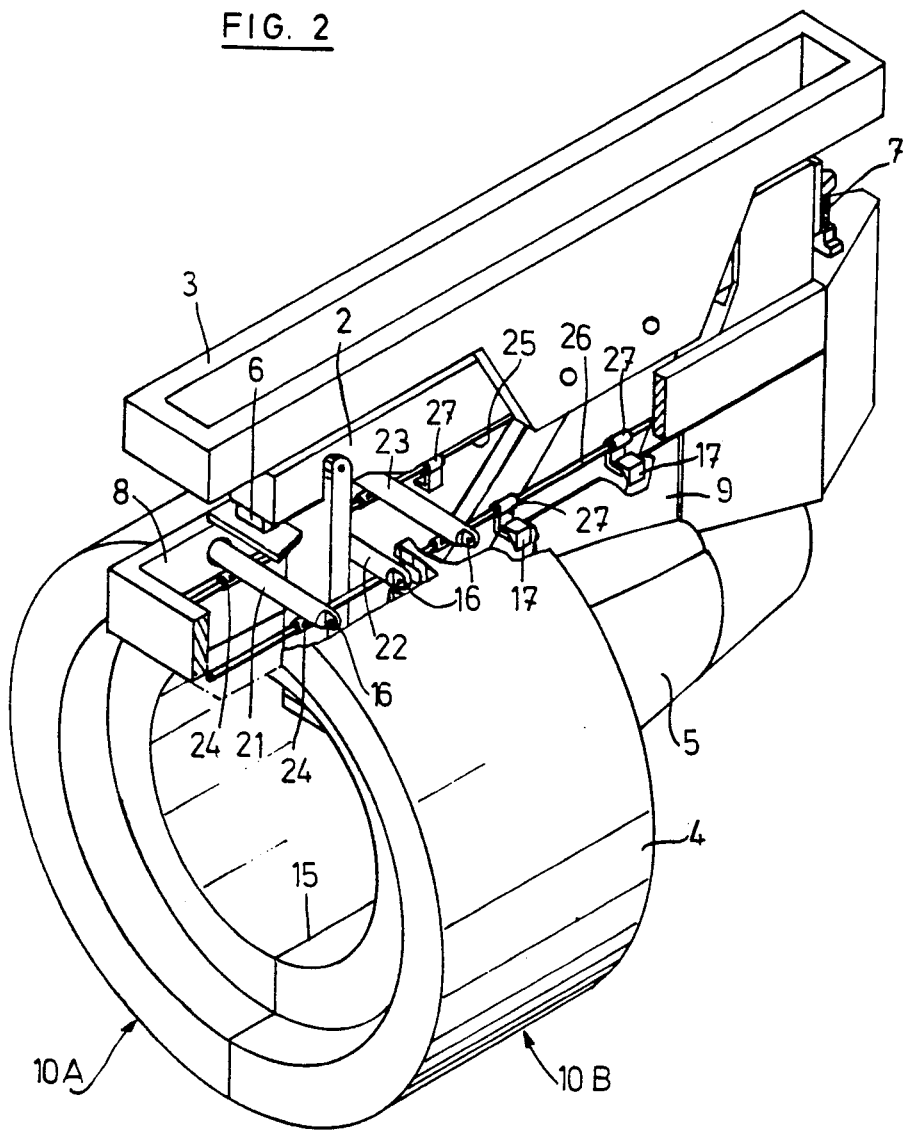
FIG. 2 is a perspective view of the suspension apparatus according to the invention in the position used when the engine is not operated.

The suspension apparatus is depicted in perspective view in FIG. 2 wherein the engine is omitted for clarity. The cowling is made in two halves 10A and 10B which are suspended separately by hinge means 16 on the fan duct part to three suspension rods 21, 22, 23 housed in the upper pylon 8. These suspension rods rest on cam means 24 which are provided in two pivotable longitudinal rods 25 and 26 pivotably mounted in and extending length wise the upper pylon. The longitudinal rods 25 and 26 also have hook means 27 arranged for cooperation with tie means 17 provided on the lower pylon 9, thereby to suspend the latter when the engine is not operated. The two cowling halves 10A and 10B are tied together by latches along the bottom splitline 15.

Figure 3:
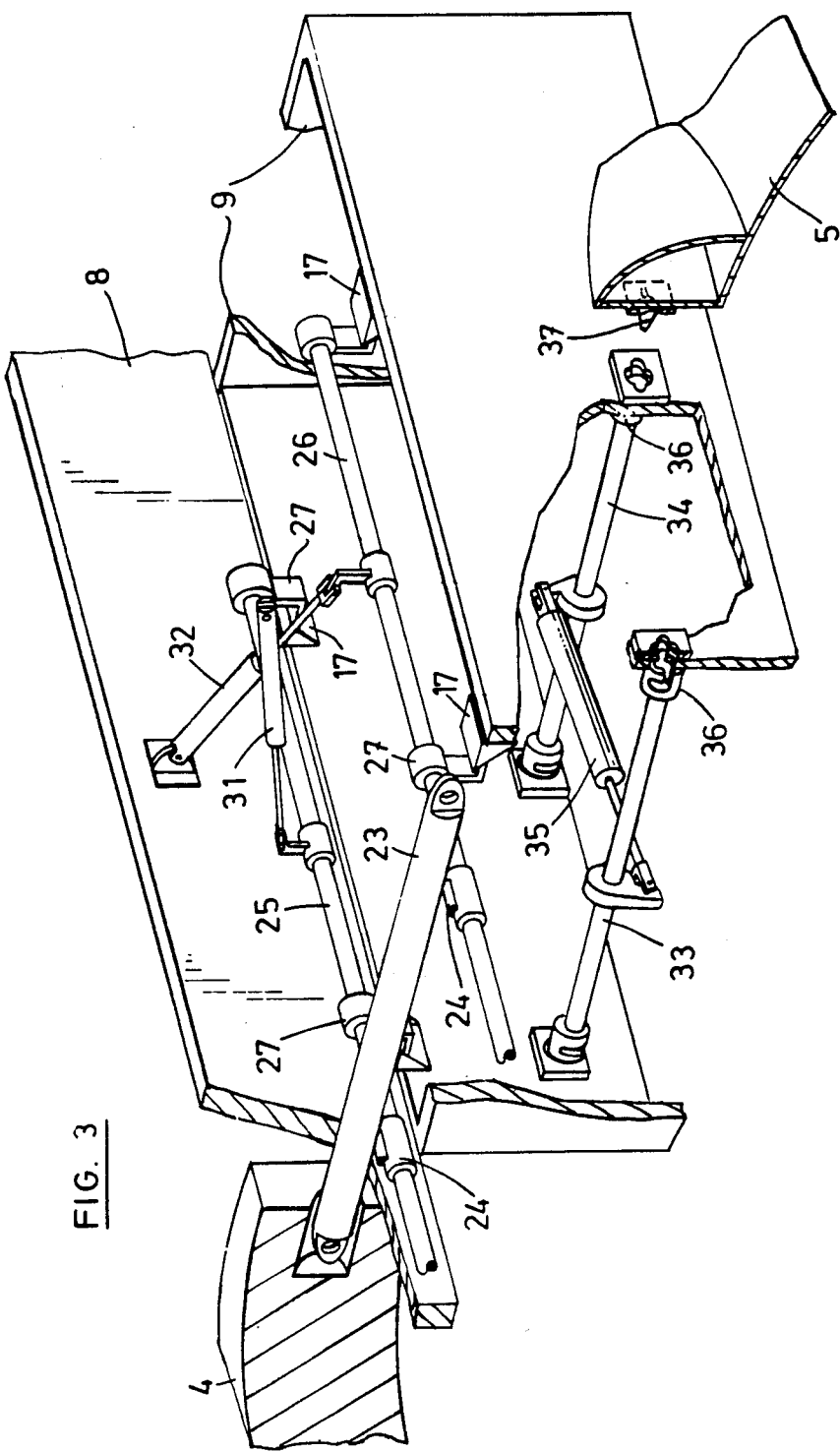
FIG. 3 is an enlarged schematic view of the suspension device in the position shown in FIG. 2.

The longitudinal rods 25 and 26 are mounted to be capable of pivoting about their centerlines. Referring to the enlarged view of FIG. 3 it is shown that the control rods 25 and 26 are coupled to actuating hydraulic jacks 31 and 32 for being pivoted under control of a drive unit (not represented). Obviously, other drive systems than a hydraulic system may be used as well to actuate the control rods.

Figure 4:
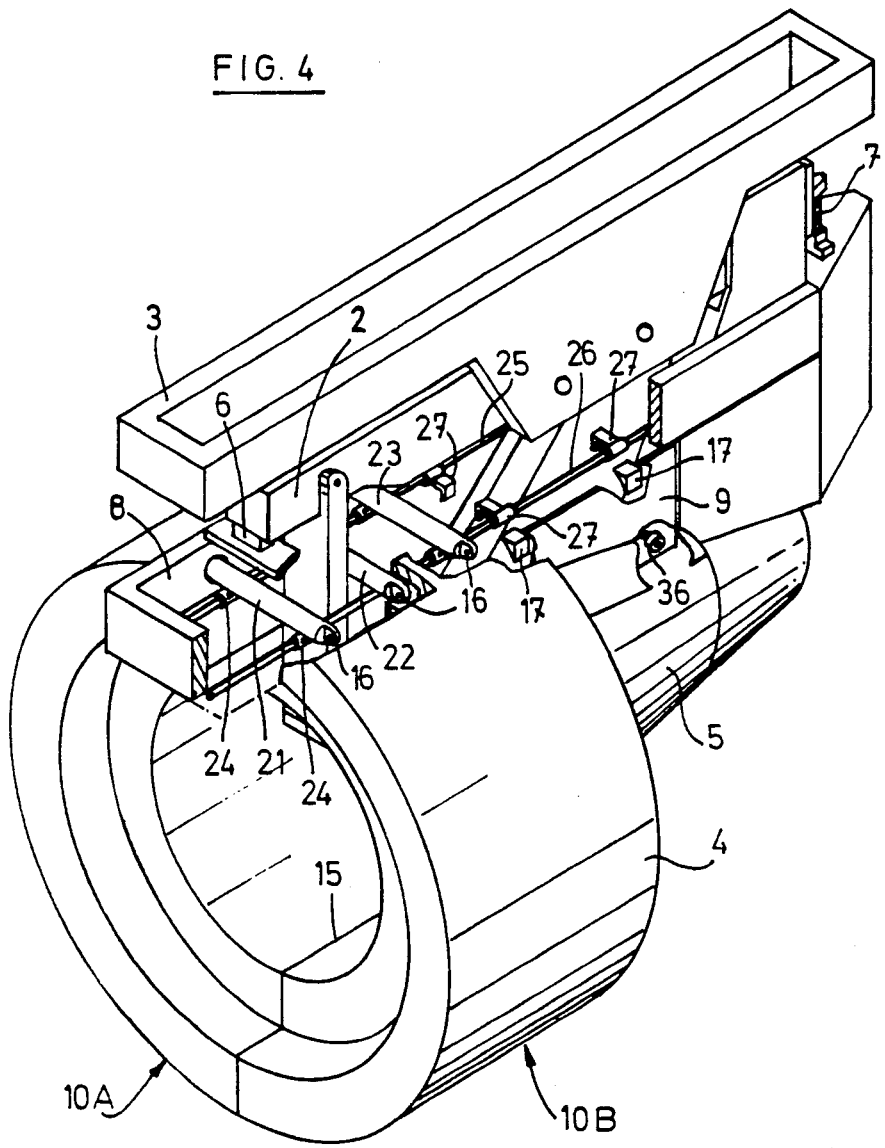
FIG. 4 is a perspective view of the suspension apparatus according to the invention in the position used when the engine is operated.
Figure 5:
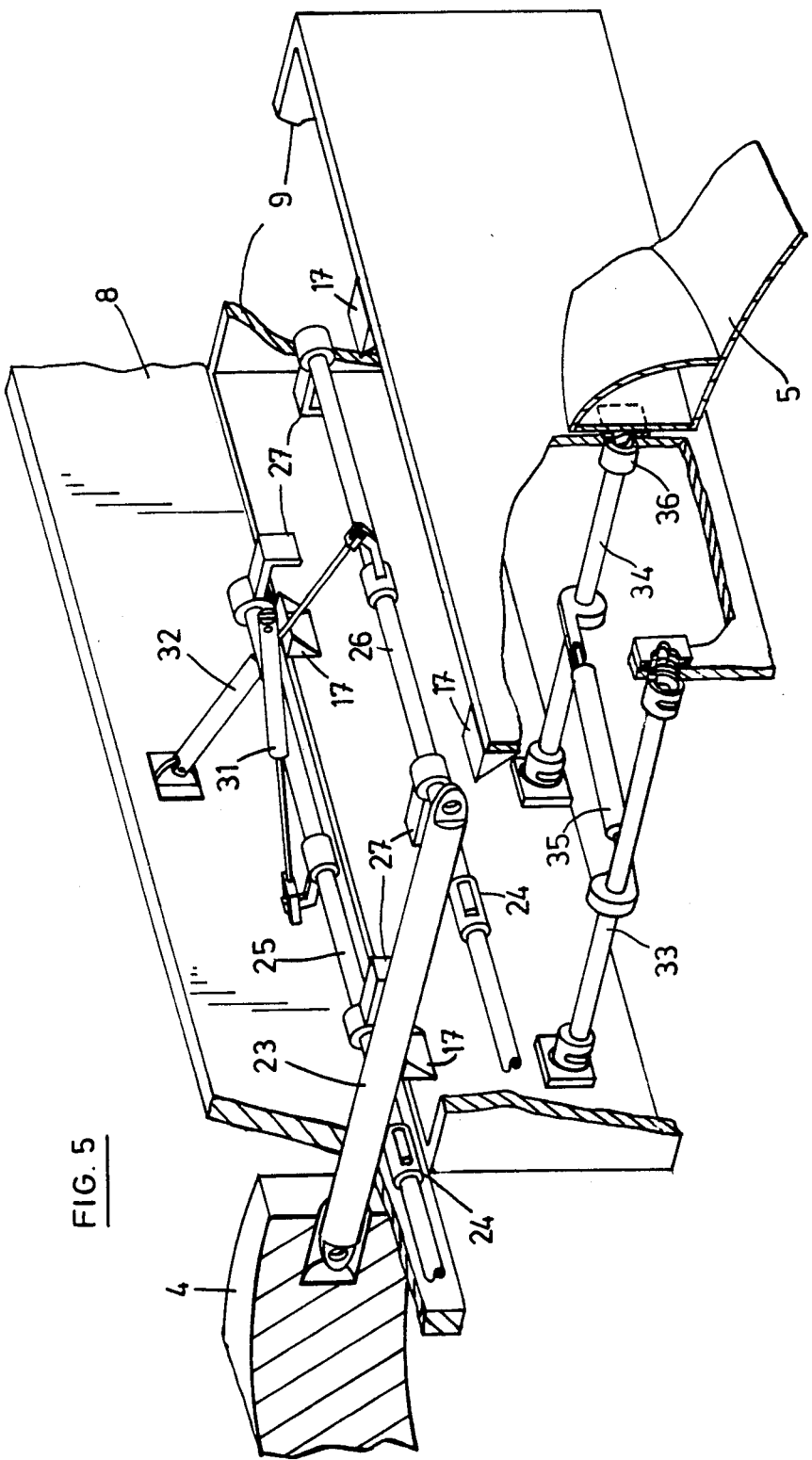
FIG. 5 is an enlarged schematic view of the suspension device in the position shown in FIG. 4.

The suspension apparatus has two positions. The first position is illustrated in FIG. 2 and in the enlarged view of FIG. 3. In this position, the longitudinal rods 25 and 26 are supported by the cams 24 and are in an angular position such that the hook means 27 solid therewith cooperate with the tie means 17 on the lower pylon 9 whereby the latter is suspended to the upper pylon 8. This first or not free position is used when the engine is not operated. The second position of the suspension apparatus is used when the engine is operated. This second or free position is illustrated in FIG. 4 and in the enlarged view of FIG. 5. When the drive unit is energized, the actuating means 31 and 32 are operated whereby the rods 25 and 26 are caused to pivot by 90° about their centerlines. The hook means 27 solid with the rods are thereby pivoted by 90° and consequently disengaged from the lower pylon tie means 17 whereby the lower pylon 9 is released from the upper pylon 8. Concurrently, the cam means 24 are rotated with the rods 25 and 26 whereby the transversal suspension rods 21, 22, 23 are lowered. As a result of this operation, the fan duct 2 is released from the suspension rods 21, 22 and 23.

Figure 6:
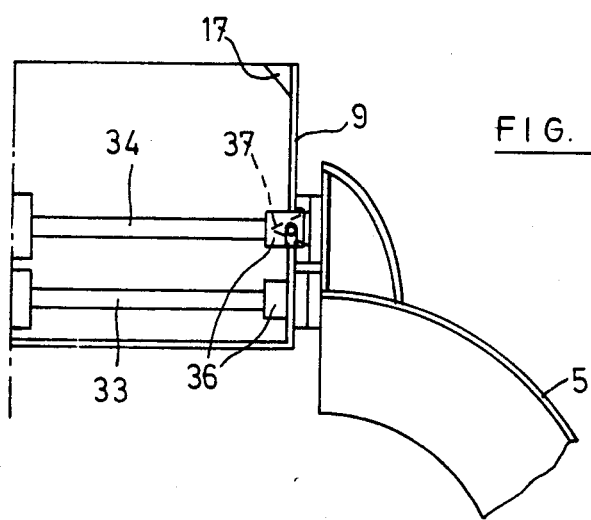
FIG. 6 is a partial sectional view along line VI—VI of FIG. 1 showing the locking device for the cowling.

At the time that the suspension device is operated, the drive unit also operates a locking device housed in the lower pylon 9. The locking device (FIG. 5) comprises two rotatable shafts 33 and 34 coupled to an actuating hydraulic jack 35 connected to be under control of the drive unit. Connected to the ends of the shafts 33 and 34 are hole seatings 36 adapted for cooperation with cone fastening pins 37 provided on the core cowl 5 of the cowling halves as shown in FIG. 6. When the shafts are caused to rotate about their centerlines by the action of the actuating jack 35, the rotating hole seatings 36 engage with and lock the fastening pins 37 whereby the core cowl part 5 of the cowling is locked to the lower pylon 9 released from the upper pylon 8. The lower pylon 9 is thereby caused to rest on the core cowl part of the cowling so as to form a solid assembly with the cowling and the engine. As a result, the cowling is permitted to effectively share the load with the engine, which results in a reduction of the engine case deflections and an efficient operation of the engine as explained earlier herein.

Where the suspension apparatus of the invention is used to suspend an engine to an aircraft wing for instance, the engine is allowed to operate in Cowl Load Sharing mode with optimum efficiency using the suspension apparatus in its free or locked position and the engine with its cowling can be rigidly secured for repair and servicing when the suspension apparatus is used in its non free position. On the other hand, when the suspension apparatus according to this invention is used in a test thrust stand for ground testing of aircraft engines, this apparatus permits testing of the engines in Cowl Load Sharinf mode as they are in real use.

What is claimed is:

1. An apparatus for the suspension of an aircraft turbo-fan engine cowling to a supporting structure, said cowling including a fan duct and a core cowl, the apparatus comprising a flexmount member to be attached to the supporting structure and a pylon, said pylon including an upper pylon element suspended to the flexmount member and a lower pylon element, the lower pylon element having attachment means; a suspension device arranged in the upper pylon element and having first hook means arranged to cooperate with said attachment means on the lower pylon element, and second hook means for suspension of the fan duct, said suspension device having a first operating state in which said first hook means are coupled with said attachment means on the lower pylon element thereby to suspend the lower pylon element to the upper pylon element and a second operating state in which said first and second hook means are disengaged from the corresponding attachment means; locking means arranged when it is operated, to lock the lower pylon element to the core cowl; and drive means to actuate the suspension device and the locking means from one operating position to the other.

2. An apparatus according to claim 1, wherein the suspension device comprises pivotable rods mounted to be pivoted about their longitudinal centerlines, said rods having a number of hook means and cam means, said cam means supporting a number of suspension rods, said pivotable rods having a first operating position in which the hook means are in engagement with attachment means on the lower pylon element while the cam means allow the suspension rods to cooperate with attachment means on the fan duct, and a second operating position in which the hook means are disengaged from the lower pylon attachment means while the cam means cause the suspension rods to be disengaged from the fan duct attachment means, and actuating means coupled to the pivotable rods to pivot same about their centerlines, said actuating means responding to the drive means for pivoting the pivotable rods from one operating position to the other.

3. An apparatus according to claim 1, further comprising a locking device located in the lower pylon element and arranged, when it is operated, to lock the lower pylon element to the core cowl.

4. An apparatus according to claim 3, wherein the locking means comprise rotatable shaft means coupled to actuating means connected to be operated by the drive means, said rotatable shaft means having lock members arranged for cooperation with lock members located on the core cowl when they are rotated thereby to lock the lower pylon element to the core cowl.

5. An apparatus according to claim 1, wherein the flexmount member is adapted for attachment to a supporting structure which forms part of an aircraft, e.g. an aircraft wing.

6. An apparatus according to claim 1, wherein the flexmount member is adapted for attachment to a supporting structure which forms part of a test thrust stand for ground testing of an aircraft engine.

7. An apparatus according to claim 2, further comprising a locking device located in the lower pylon element and arranged, when it is operated, to lock the lower pylon element to the core cowl.

8. An apparatus according to claim 7, wherein the locking means comprise rotatable shaft means coupled to actuating means connected to be operated by the drive means, said rotatable shaft means having lock members arranged for cooperation with lock members located on the core cowl when they are rotated thereby to lock the lower pylon element to the core cowl.

9. An apparatus according to claim 7, wherein the flexmount member is adapted for attachment to a supporting structure which forms part of an aircraft, e.g. an aircraft wing.

10. An apparatus according to claim 7, wherein the flexmount member is adapted for attachment to a supporting structure which forms part of a test thrust stand for ground testing of an aircraft engine.

* * * * *